United States Patent
Kosugi et al.

(10) Patent No.: US 11,271,916 B2
(45) Date of Patent: Mar. 8, 2022

(54) SYSTEM AND METHOD FOR PREVENTING ACCOMPLISHMENT OF UNAUTHORIZED COMMUNICATION

(71) Applicant: KABUSHIKI KAISHA TOKAI RIKA DENKI SEISAKUSHO, Aichi (JP)

(72) Inventors: Masanori Kosugi, Aichi (JP); Shigenori Nitta, Aichi (JP); Masateru Furuta, Aichi (JP); Tadashi Fukagai, Aichi (JP); Masayuki Kawamura, Aichi (JP); Yuki Kono, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 223 days.

(21) Appl. No.: 16/543,931

(22) Filed: Aug. 19, 2019

(65) Prior Publication Data

US 2020/0067898 A1 Feb. 27, 2020

(30) Foreign Application Priority Data

Aug. 23, 2018 (JP) .............................. JP2018-156297

(51) Int. Cl.
*H04L 29/06* (2006.01)
(52) U.S. Cl.
CPC .................................... *H04L 63/08* (2013.01)
(58) Field of Classification Search
CPC ........ H04L 63/08; H04W 12/63; H04W 12/61
See application file for complete search history.

(56) References Cited

U.S. PATENT DOCUMENTS

| 5,381,444 A | * | 1/1995 | Tajima .................. G01S 13/762 342/118 |
| 6,298,219 B1 | * | 10/2001 | Patronen ............... H04W 16/18 455/424 |
| 9,524,385 B1 | * | 12/2016 | McKinley ............. G06F 21/305 |
| 10,887,107 B1 | * | 1/2021 | Chan ..................... H04L 9/3236 |
| 2005/0227692 A1 | * | 10/2005 | Kawashima ........ H04W 36/365 455/435.2 |

(Continued)

FOREIGN PATENT DOCUMENTS

| JP | 2014-227647 A | 12/2014 |
| JP | 2019-183487 A | 10/2019 |

*Primary Examiner* — Aravind K Moorthy
(74) *Attorney, Agent, or Firm* — Greenblum & Bernstein, P.L.C.

(57) ABSTRACT

A system that prevents accomplishment of unauthorized communication between a terminal and a communication peer is provided. The system includes a measurement unit and a process execution unit. The measurement unit is arranged on at least one of the terminal or the communication peer to obtain a measured value corresponding to a distance between the terminal and the communication peer. The process execution unit determines whether the measured value is appropriate and controls actuation for authentication of the terminal through wireless communication performed between the terminal and the communication peer based on the determination result. The measurement unit executes a process for obtaining the measured value in a time period during which the communication for the authentication is not performed.

6 Claims, 5 Drawing Sheets

(56) References Cited

U.S. PATENT DOCUMENTS

| | | | | |
|---|---|---|---|---|
| 2006/0154631 A1* | 7/2006 | Nakano | ............... | H04L 63/061 455/181.1 |
| 2007/0186273 A1* | 8/2007 | Carpy | ............... | H04L 63/0281 726/2 |
| 2008/0001734 A1* | 1/2008 | Stilp | ............... | G08B 25/009 340/539.22 |
| 2009/0315792 A1* | 12/2009 | Miyashita | ............... | H01Q 21/24 343/742 |
| 2011/0116386 A1* | 5/2011 | Blanchard | ............... | H04B 7/155 370/242 |
| 2011/0238995 A1* | 9/2011 | Blanco | ............... | H04W 12/06 713/173 |
| 2012/0254825 A1* | 10/2012 | Sharma | ............... | G06F 8/36 717/101 |
| 2013/0009812 A1* | 1/2013 | Sato | ............... | B64G 1/36 342/357.26 |
| 2013/0141283 A1* | 6/2013 | Galov | ............... | G01S 5/14 342/464 |
| 2014/0334466 A1* | 11/2014 | Ignatchenko | ............... | H04L 9/32 370/338 |
| 2014/0370884 A1* | 12/2014 | Kummetz | ............... | H04W 24/10 455/423 |
| 2015/0119071 A1* | 4/2015 | Basha | ............... | G01S 11/06 455/456.1 |
| 2015/0319708 A1* | 11/2015 | Otonari | ............... | H04L 5/0073 370/329 |
| 2016/0087450 A1* | 3/2016 | Takahashi | ............... | H02J 50/12 307/104 |
| 2016/0292940 A1* | 10/2016 | Tschache | ............... | G07C 9/00309 |
| 2017/0041740 A1* | 2/2017 | Kanayama | ............... | H04W 4/029 |
| 2017/0045627 A1* | 2/2017 | Larsson | ............... | H04B 7/08 |
| 2017/0244511 A1* | 8/2017 | Hunt | ............... | H04K 3/224 |
| 2017/0257383 A1* | 9/2017 | Ficarra | ............... | G06F 21/44 |
| 2018/0019902 A1* | 1/2018 | Suh | ............... | H04L 27/2602 |
| 2018/0040941 A1* | 2/2018 | Lee | ............... | H01Q 1/48 |
| 2018/0092117 A1* | 3/2018 | Azizi | ............... | H04W 74/006 |
| 2018/0103019 A1* | 4/2018 | Chen | ............... | H04W 12/63 |
| 2018/0118163 A1* | 5/2018 | Murakami | ............... | B60R 25/01 |
| 2018/0227877 A1* | 8/2018 | Gunnarsson | ............... | H04L 67/04 |
| 2018/0285309 A1* | 10/2018 | Prentice | ............... | G06F 13/4022 |
| 2018/0361990 A1* | 12/2018 | Nishiyama | ............... | B60R 25/01 |
| 2019/0051072 A1* | 2/2019 | Okada | ............... | H04B 1/7163 |
| 2019/0053021 A1* | 2/2019 | Fuke | ............... | B60R 25/245 |
| 2019/0075212 A1* | 3/2019 | Yokoyama | ............... | H04N 1/00307 |
| 2019/0080539 A1* | 3/2019 | Yoshikawa | ............... | E05B 49/00 |
| 2019/0098472 A1* | 3/2019 | Yoshihara | ............... | H04M 1/72463 |
| 2019/0126779 A1* | 5/2019 | Saitou | ............... | G01S 13/003 |
| 2019/0342751 A1* | 11/2019 | Li | ............... | H04L 63/061 |
| 2019/0355196 A1* | 11/2019 | Plattner | ............... | G07C 9/00309 |
| 2020/0001822 A1* | 1/2020 | Han | ............... | B60R 25/10 |
| 2020/0021679 A1* | 1/2020 | Yun | ............... | H04W 12/041 |
| 2020/0106158 A1* | 4/2020 | Gomez Angulo | ............... | H01Q 1/243 |
| 2021/0016743 A1 | 1/2021 | Kusumoto et al. | | |

* cited by examiner

SYSTEM AND METHOD FOR PREVENTING ACCOMPLISHMENT OF UNAUTHORIZED COMMUNICATION

BACKGROUND

1. Field

The present disclosure relates to a system and a method for preventing accomplishment of unauthorized communication between a terminal and a communication peer.

2. Description of Related Art

A known distance measurement system measures the distance between a terminal and a communication peer by performing radio communication between the terminal and the communication peer and determines the appropriateness of the measured value (measured distance). Japanese Laid-Open Patent Publication No. 2014-227647 discloses an example of such a distance measurement system. This type of distance measurement system may be used as an unauthorized communication accomplishment prevention system that determines whether to validate or invalidate communication based on the result of determination of whether the measured value of distance is appropriate. The unauthorized communication accomplishment prevention system, for example, obtains a measured value corresponding to the distance between the terminal and the communication peer and determines whether the measured value is appropriate (in a predetermined range). When the measured value is appropriate, for example, execution of wireless ID verification between the terminal and the communication peer is allowed. If the ID verification is accomplished, the terminal is allowed to operate the communication peer.

SUMMARY

It is desirable that this type of unauthorized communication accomplishment prevention system and method be realized without the need for a large change in a conventional system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embodiment is a system that prevents accomplishment of unauthorized communication between a terminal and a communication peer. The system includes a measurement unit and a process execution unit. The measurement unit is arranged on at least one of the terminal or the communication peer to obtain a measured value corresponding to a distance between the terminal and the communication peer. The process execution unit determines whether the measured value is appropriate and controls actuation for authentication of the terminal through wireless communication performed between the terminal and the communication peer based on the determination result. The measurement unit executes a process for obtaining the measured value in a time period during which the communication for the authentication is not performed.

Another embodiment is a method for preventing accomplishment of unauthorized communication between a terminal and a communication peer. The method includes obtaining a measured value corresponding to a distance between the terminal and the communication peer with a measurement unit arranged on at least one of the terminal or the communication peer, determining whether the measured value is appropriate to produce a determination result, and controlling actuation for authentication of the terminal through wireless communication performed between the terminal and the communication peer based on the determination result. The measurement unit executes a process for obtaining the measured value in a time period during which the communication for the authentication is not performed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of a system and a method for preventing accomplishment of unauthorized communication will now be described with reference to FIGS. 1 to 4.

Figure 1:
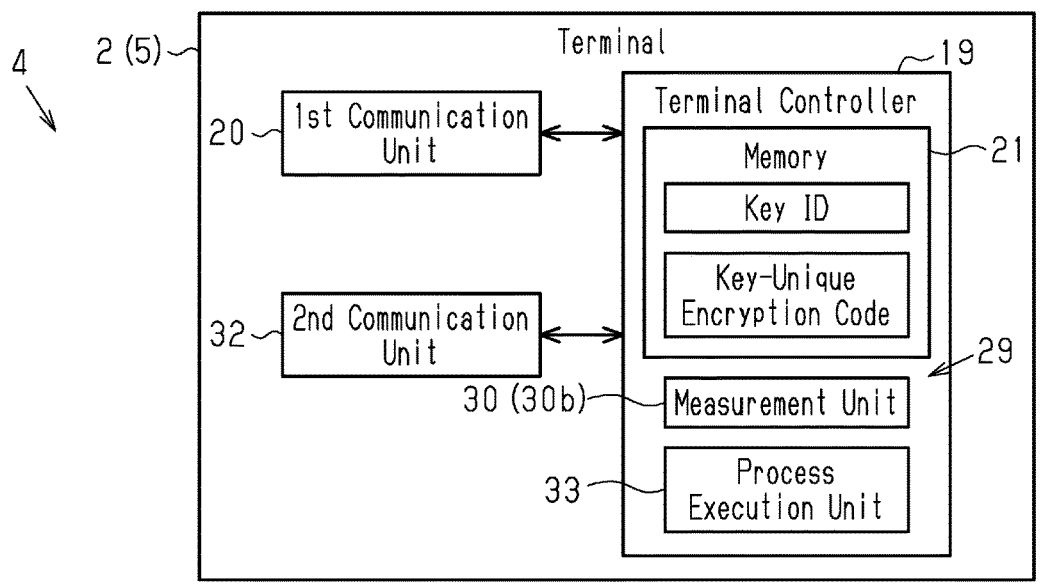
FIG. 1 is a schematic configuration diagram illustrating a first embodiment of an unauthorized communication accomplishment prevention system.
Figure 1:
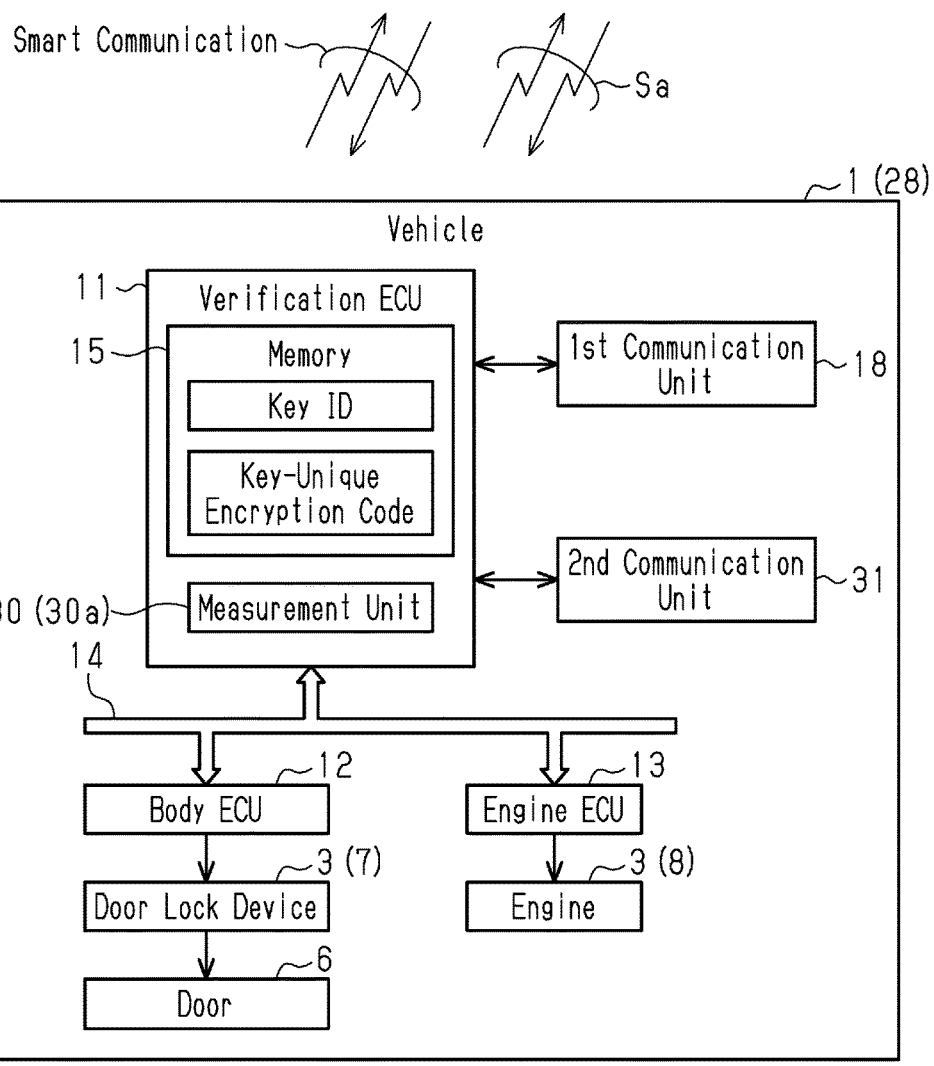

As illustrated in FIG. 1, a vehicle 1 is configured to perform wireless communication with a terminal 2. The vehicle 1 is an example of a communication peer 28 that communicates with the terminal 2. In the present example, the terminal 2 is an electronic key 5. The vehicle 1 and the terminal 2 (electronic key 5) establish an electronic key system 4. In the electronic key system 4, the vehicle 1 determines whether the terminal 2 is authentic and, if the terminal 2 is authenticated, allows actuation of an on-board device 3. In the present example, the electronic key system 4 constructs a smart verification system. In the smart verification system, for example, when the vehicle 1 starts to perform wireless communication with the terminal 2, the terminal 2 is authenticated in accordance with an authentication communication sequence performed between the vehicle 1 and the terminal 2. In the smart verification system, the verification process performed for authenticating the terminal 2 is referred to as the smart verification. Communication for executing the smart verification is referred to as the smart communication. The on-board device 3 includes, for example, a door lock device 7 that controls locking and unlocking of a door 6 and an engine 8 of the vehicle 1 but is not limited to these.

The vehicle 1 includes a verification ECU 11 that executes a process for authenticating the terminal 2, a body ECU 12 that controls the power supply of on-board electric components, and an engine ECU 13 that controls the engine 8. The ECUs 11 to 13 are connected by an in-vehicle communication line 14 and establish, for example, controller area network (CAN) and/or local interconnect network (LIN). The verification ECU 11 includes memory 15 that stores a key ID and a key-unique encryption code. The key ID and the key-unique encryption code belong to the terminal 2 (the electronic key 5) registered in the vehicle 1 and are used for authentication of the terminal 2 (in the present example, smart verification). The body ECU 12 controls the door lock device 7 so that the door 6 is switched between a locked state and an unlocked state.

The vehicle 1 includes a first communication unit 18 that preforms wireless communication with the terminal 2 to authenticate the terminal 2. In the present example, the electronic key system 4 (smart verification system) supports bidirectional communication that uses a radio wave of a low frequency (LF) band and a radio wave of an ultra high frequency (UHF) band. Although not illustrated in the drawings, the first communication unit 18 includes a radio wave transmitter that transmits an LF radio wave and a radio wave receiver that receives a UHF radio wave. In the present example, the radio wave transmitter includes an outdoor transmitter that transmits a radio wave to the outside of the vehicle 1 to form an outdoor area and an indoor transmitter that transmits a radio wave inside the vehicle 1 to form an indoor area.

The terminal 2 includes a terminal controller 19 that centrally controls the terminal 2 and a first communication unit 20 that performs wireless communication with the vehicle 1 to authenticate the terminal 2. The terminal controller 19 includes memory 21 storing the key ID and the key-unique encryption code that are used for authentication of the terminal 2. Although not illustrated in the drawings, when the electronic key system 4 (smart verification system) supports LF-UHF bidirectional communication, the first communication unit 20 includes a radio wave receiver that receives an LF radio wave and a radio wave transmitter that transmits a UHF radio wave.

The first communication unit 18 of the vehicle 1 regularly or irregularly transmits a wake signal of an LF radio wave. The terminal 2 is activated from a standby state in response to reception of the wake signal and transmits an ack signal (acknowledge signal) of a UHF radio wave. In response to reception of the ack signal from the terminal 2, the verification ECU 11 starts the smart verification (authentication of the terminal 2). At this time, when the terminal 2 transmits an ack signal to the vehicle 1 in response to a wake signal from the outdoor transmitter of the first communication unit 18, the verification ECU 11 performs outdoor smart verification through communication with the terminal 2 located outside the vehicle 1. When the terminal 2 transmits an ack signal to the vehicle 1 in response to a wake signal from the indoor transmitter of the first communication unit 18, the verification ECU 11 performs indoor smart verification through communication with the terminal 2 located inside the vehicle 1. In the present example, the smart verification performed to authenticate the terminal 2 includes execution of ID verification that verifies the key ID of the terminal 2 and execution of challenge-response authentication that uses the key-unique encryption code. As will be described later, in the challenge-response authentication, each of the vehicle 1 (verification ECU 11) and the terminal 2 (terminal controller 19) calculates a response code based on a challenge code, which is a random number, and the key-unique encryption code. The vehicle 1 (or terminal 2) determines whether the two response codes match.

The electronic key system 4 (smart verification system) includes an unauthorized communication detection function (unauthorized communication accomplishment prevention system 29) that obtains a measured value Dx corresponding to the distance between the terminal 2 and the communication peer 28 (in the present example, vehicle 1), verifies the appropriateness of the measured value Dx, and determines whether to accomplish the authentication of the terminal 2 (in the present example, smart verification). For example, when the terminal 2 located far away from the vehicle 1 is connected to the vehicle 1 by a relay unit or the like to perform unauthorized communication, the unauthorized communication accomplishment prevention system 29 prevents unauthorized accomplishment of the smart verification.

The unauthorized communication accomplishment prevention system 29 determines whether wireless communication (in the present example, smart communication) that is performed between the vehicle 1 and the terminal 2 for authentication of the terminal 2 is unauthorized. If it is determined that unauthorized communication is performed, the unauthorized communication accomplishment prevention system 29 disconnects the communication for the authentication. In the present example, the terminal 2 functions to disconnect communication for authentication when unauthorized communication is performed.

The unauthorized communication accomplishment prevention system 29 includes a measurement unit 30 that obtains the measured value Dx corresponding to the distance between the vehicle 1 and the terminal 2. The measurement unit 30 may be arranged on at least one of the vehicle 1 or the terminal 2. In the present example, the measurement unit 30 is arranged on both the vehicle 1 and the terminal 2. In this case, the measurement unit 30 includes a controller-side measurement unit 30a arranged on the vehicle 1 and a terminal-side measurement unit 30b arranged on the terminal 2. The vehicle 1 includes a second communication unit 31 for measuring a distance. The terminal 2 includes a second communication unit 32 for measuring a distance. In the present example, the second communication units 31 and 32 are each configured to transmit and receive a radio wave of an ultra wide band (UWB). The measurement unit 30 transmits a UWB radio wave Sa between the vehicle 1 and the terminal 2 to calculate a propagation time of the UWB radio wave Sa and calculates the measured value Dx from the propagation time. The measured value Dx is a measured distance value corresponding to the distance between the vehicle 1 and the terminal 2. As described above, the unauthorized communication detection function is a distance measurement function that measures the distance between the vehicle 1 and the terminal 2 and determines whether the communication is authorized based on the measured distance. The UWB radio wave Sa is an example of a distance measuring radio wave.

The unauthorized communication accomplishment prevention system 29 further includes a process execution unit 33 that determines whether the measured value Dx is appropriate and controls actuation for authentication of the terminal 2 through wireless communication (in the present example, smart communication) performed between the terminal 2 and the vehicle 1 (communication peer 28) based on the determination result. In the present example, the terminal 2 includes the process execution unit 33. The process execution unit 33 verifies and determines the appropriateness of the measured value Dx. When it is determined that the measured value Dx is appropriate (for example, the measured value Dx is less than a specified value Dk), the process execution unit 33 allows accomplishment of the smart communication and validates the result of the smart verification. When the measured value Dx is not appropriate (for example, the measured value Dx is greater than or equal to the specified value Dk), the process execution unit 33 does not allow accomplishment of the smart communication and invalidates the result of the smart verification.

The measurement unit 30 executes the process for obtaining the measured value Dx in a time period during which communication (in the present example, smart communication) for authentication of the terminal 2 is not performed. The communication for authentication includes multiple communications specifying an authentication communication sequence performed between the vehicle 1 and the terminal 2. In the present example, the multiple communications include wake signal communication, ack signal communication, challenge code communication, and response code communication. The wake signal communication may be specified as the start of the authentication communication sequence. The response code communication may be specified as the end of the authentication communication sequence. Preferably, the time period during which communication for authentication is not performed is a non-communication period (i.e., idle period) during which none of the multiple communications is performed in a period from when the authentication communication sequence is started to when the authentication communication sequence is ended. The measurement unit 30 executes the process for obtaining the measured value Dx in the non-communication period. In the present example, the measurement unit 30 executes the process for obtaining the measured value Dx in a non-communication period (time period Ts illustrated in FIG. 2) between the challenge code communication and the response code communication.

The operation of the unauthorized communication accomplishment prevention system 29 will now be described with reference to FIGS. 2 to 4.

Figure 2:
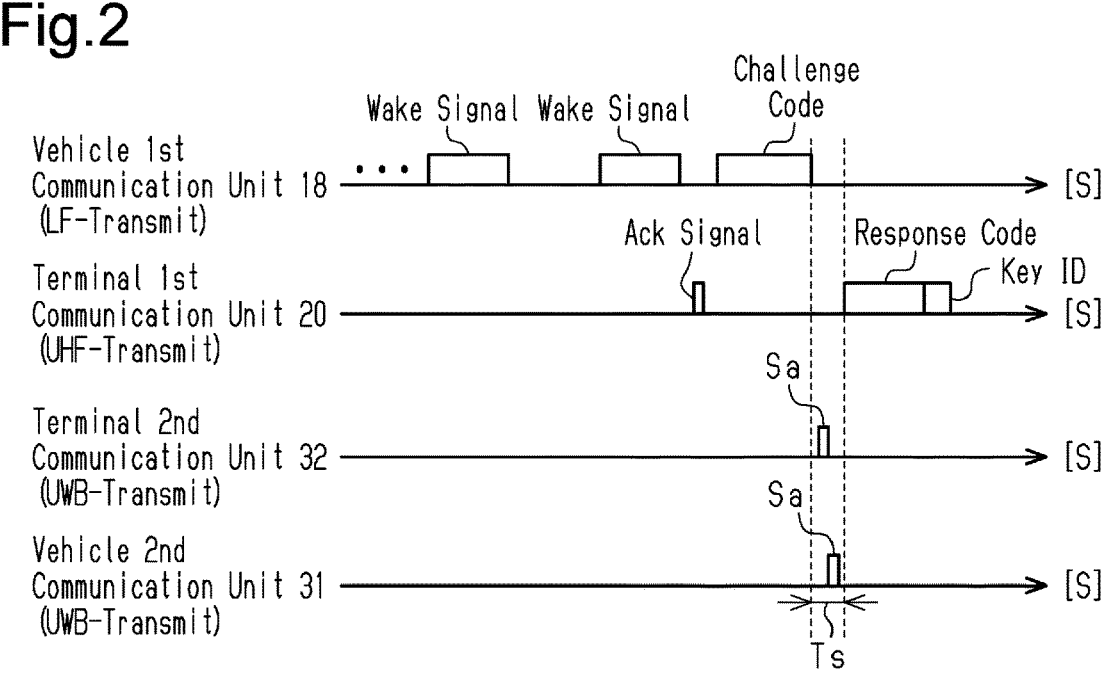
FIG. 2 is a communication sequence chart schematically illustrating a distance measurement process incorporated in smart communication (authentication communication sequence).

As illustrated in FIG. 2, the first communication unit 18 of the vehicle 1 regularly or irregularly transmits a wake signal on an LF radio wave to determine whether the terminal 2 is present around the vehicle 1. The wake signal is a signal that activates the terminal 2. When the terminal 2 enters the communication area of the wake signal and receives a wake signal, the terminal 2 is activated from the standby state and transmits an ack signal on a UHF radio wave from the first communication unit 20. If the verification ECU 11 receives the ack signal in a specified time after transmission of the wake signal, the verification ECU 11 transmits data for executing the smart verification to the terminal 2.

In the present example, the verification ECU 11 transmits a challenge code on an LF radio wave from the first communication unit 18. The challenge code may be formed from a random number having a value that changes whenever transmitted. When the terminal 2 receives the challenge code from the vehicle 1, the terminal 2 retrieves the key-unique encryption code from the memory 21 and calculates a response code by combining the key-unique encryption code with the challenge code.

In the present example, when the terminal 2 receives a challenge code, the terminal-side measurement unit 30b of the terminal 2 executes a process for obtaining the measured value Dx (i.e., measured distance value) corresponding to the distance between the vehicle 1 and the terminal 2. As illustrated in FIG. 2, the time period Ts, which is from when the terminal 2 receives the challenge code to when the terminal 2 calculates a response code based on the challenge code and transmits the response code to the vehicle 1, is the non-communication period in which communication for authentication is not performed. In the present example, the terminal-side measurement unit 30b of the terminal 2 measures the distance between the vehicle 1 and the terminal 2 in the time period Ts.

Figure 3:
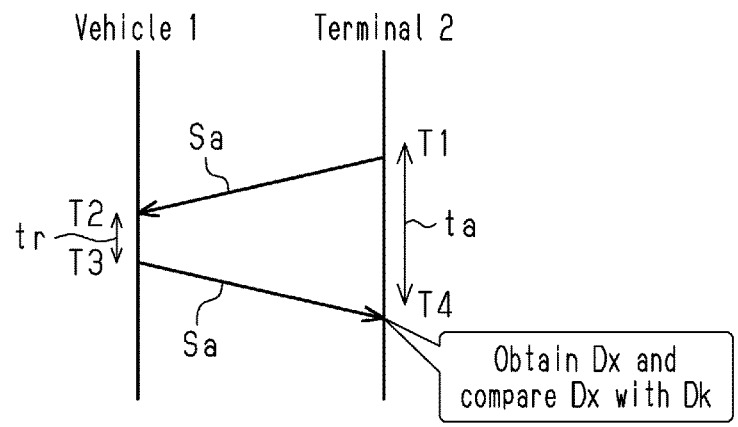
FIG. 3 is a communication sequence chart illustrating the distance measurement process.

As illustrated in FIG. 3, at the distance measurement start time (time T1), the terminal-side measurement unit 30b of the terminal 2 transmits a UWB radio wave Sa from the second communication unit 32. In the present example, the distance measurement start time is when the terminal 2 receives a challenge code. When the controller-side measurement unit 30a of the vehicle 1 receives the UWB radio wave Sa from the terminal 2 with the second communication unit 31 (time T2), the controller-side measurement unit 30a of the vehicle 1 sends back the UWB radio wave Sa from the second communication unit 31 (time T3). The terminal-side measurement unit 30b of the terminal 2 receives the UWB radio wave Sa from the vehicle 1 with the second communication unit 32 (time T4).

The terminal-side measurement unit 30b calculates time tp, which is from time T1 to time T2, using equation (1) and calculates the measured value Dx corresponding to the distance between the vehicle 1 and the terminal 2 from time tp using equation (2).

$$tp=(ta-tr)/2 \qquad (1)$$

$$Dx=tp \times 3 \times 10^8 \qquad (2)$$

In equation (1), ta represents the time from time T1 to time T4. Time ta may be obtained, for example, using a timer arranged in the terminal 2 by counting time from when the terminal 2 transmits a UWB radio wave Sa to when the terminal 2 receives the UWB radio wave Sa sent back from the vehicle 1. In equation (2), tr represents the time from time T2 to time T3. Time tr may be obtained, for example, using a timer arranged in the vehicle 1 by counting time from when the vehicle 1 receives the UWB radio wave Sa from the terminal 2 to when the vehicle 1 sends back the UWB radio wave Sa to the terminal 2. For example, the vehicle 1 may transmit information related to time tr together with the UWB radio wave Sa to the terminal 2.

When the measured value Dx is less than the specified value Dk, the process execution unit 33 determines that the distance between the vehicle 1 and the terminal 2 is appropriate. In this case, the process execution unit 33 does not disconnect the communication (smart communication) for authentication in the electronic key system (smart verification system). In other words, unauthorized communication is not detected with the unauthorized communication detection function (distance measurement function), and the process execution unit 33 allows accomplishment of smart communication. When the measured value Dx is greater than or equal to the specified value Dk, the process execution unit 33 determines that the distance between the vehicle 1 and the terminal 2 is inappropriate. In this case, the process execution unit 33 disconnects the communication (smart communication) for authentication in the electronic key system (smart verification system). For example, when unauthorized communication is performed between the vehicle 1 and the terminal 2 using a relay unit, the measured value Dx is greater than or equal to the specified value Dk. Thus, the unauthorized communication detection function (distance measurement function) detects unauthorized communication, and the process execution unit 33 does not allow accomplishment of the smart communication.

When the unauthorized communication detection function allows accomplishment of the smart communication, the terminal 2 transmits the response code (terminal-side response code) obtained by the above-described calculation together with the key ID, which is stored in the memory 21 of the terminal 2, on a UHF radio wave to the vehicle 1. In the same manner as the calculation of the terminal-side response code, the verification ECU 11 calculates a response code (controller-side response code) by combining the challenge code with the key-unique encryption code stored in the memory 15. The verification ECU 11 determines whether the terminal-side response code matches the controller-side response code. When the two response codes match, the verification ECU 11 determines that the challenge-response authentication is accomplished. The verification ECU 11 also executes ID verification to determine whether the key ID received from the terminal 2 matches the key ID stored in the memory 15. When both the challenge-response authentication and the ID verification are accomplished, the verification ECU 11 determines that the smart verification is accomplished.

When the outdoor smart verification is accomplished through communication with the terminal 2 located outside the vehicle 1, the verification ECU 11 allows or performs the locking and unlocking of the door 6 with the body ECU 12. For example, when the door 6 is locked and an outside door handle is touched, the door 6 is unlocked. When the door 6 is unlocked and the lock button on the outside door handle is pressed, the door 6 is locked. When the indoor smart verification is accomplished through communication with the terminal 2 located inside the vehicle 1, the verification ECU 11 allows a transition operation of the power supply of the vehicle 1 with the engine switch (not illustrated) arranged in the vehicle 1. For example, when the engine switch is operated as the brake pedal (not illustrated) is depressed, the engine 8 starts.

Figure 4:
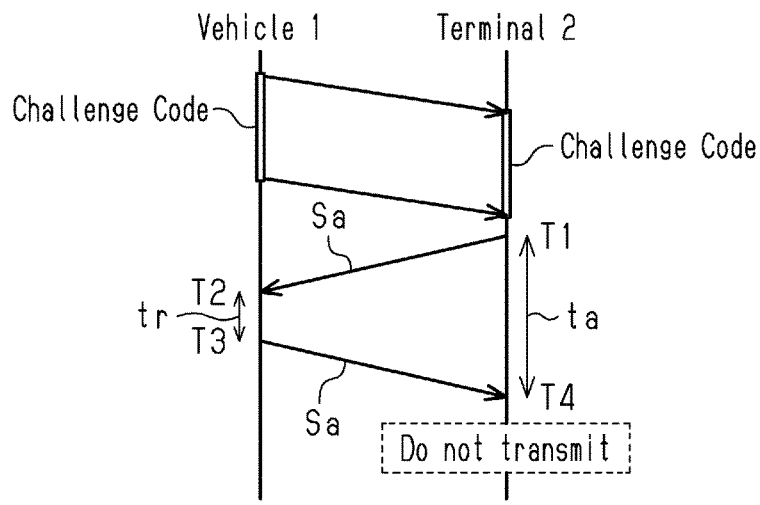
FIG. 4 is a communication sequence chart illustrating a case in which unauthorized communication is detected.

As illustrated in FIG. 4, when the unauthorized communication detection function does not allow accomplishment of the smart communication, the terminal 2 does not transmit the terminal-side response code (and the key ID). In this case, since the terminal-side response code is not received within a specified time after transmission of the challenge code, the verification ECU 11 determines that the challenge-response authentication is not satisfied. Accordingly, the smart verification is not accomplished. Thus, unauthorized communication performed using, for example, a relay unit will not be accomplished.

The present embodiment has the advantages described below.

(1) The unauthorized communication accomplishment prevention system 29 includes the measurement unit 30 that obtains the measured value Dx corresponding to the distance between the terminal 2 and the vehicle 1 (the communication peer 28). The system 29 further includes the process execution unit 33 that determines whether the measured value Dx is appropriate and controls actuation for authentication of the terminal 2 through wireless communication (in the present example, smart verification) performed between the terminal 2 and the vehicle 1 based on the determination result. The measurement unit 30 executes the process for obtaining the measured value Dx in the time period Ts in which the communication for the authentication is not performed. With this configuration, the electronic key system 4 may implement the unauthorized communication detection function with a subtle effect on the specifications of a conventional electronic key system, that is, without a large change in a conventional electronic key system.

(2) The measurement unit 30 calculates the propagation time of the distance measuring radio wave (the UWB radio wave Sa) that is transmitted between the vehicle 1 and the terminal 2 through wireless communication and calculates a measured distance value between the terminal 2 and the vehicle 1 as the measured value Dx from the propagation time. The use of such a measured distance value (measured value Dx) accurately determines whether communication between the terminal 2 and the vehicle 1 is unauthorized communication.

(3) The communication for authentication (in the present example, smart verification) includes multiple communications specifying an authentication communication sequence. In the present example, the multiple communications include wake signal communication, ack signal communication, challenge code communication, and response code communication that are performed between the vehicle 1 and the terminal 2. The time period Ts during which the communication for the authentication is not performed is a non-communication period during which none of the multiple communications is performed in a period from when the authentication communication sequence is started to when the authentication communication sequence is ended. Since the non-communication period, that is, an idle period during which the communication (in the present example, smart communication) is not performed is used when obtaining the measured value Dx (in the present example, measuring distance through UWB communication), the time for performing the communication for authentication will not be extended.

(4) In the present example, the communication for authentication includes challenge-response authentication. In the challenge-response authentication, a challenge code is transmitted from one of the vehicle 1 and the terminal 2 to the other. In the present example, the challenge code is transmitted from the vehicle 1 to the terminal 2, and the terminal 2 calculates a response code and transmits the response code to the vehicle 1. In such smart communication including challenge-response authentication, the distance measurement start trigger is set to a point in time at which the challenge code is received by the terminal 2. With this configuration, the time period Ts from when the terminal 2 calculates a response code to when the terminal 2 transmits the response code to the vehicle 1 is used to efficiently measure the distance (calculate the measured value Dx). Alternatively, the distance measurement start trigger may be set to a point in time at which the terminal 2 receives a wake signal. In this case, the distance is measured in a time period to when the terminal 2 transmits an ack signal to the vehicle 1.

(5) When unauthorized communication is detected based on the measured value Dx, the process execution unit 33 controls actuation for the authentication so that the terminal 2 (or the vehicle 1) that received the challenge code is prohibited from transmitting a response code, thereby disconnecting the communication for the authentication. With this configuration, without a large change in a conventional electronic key system, a simple process is added to allow the electronic key system 4 to implement the unauthorized communication detection function.

Second Embodiment

A second embodiment will now be described with reference to FIGS. 5 and 6. The second embodiment differs from the first embodiment in that the process for disconnecting communication is changed. Like or the same reference numerals are given to those components that are like or the same as the corresponding components of the first embodiment. Mainly, the differences from the first embodiment will be discussed below.

Figure 5:
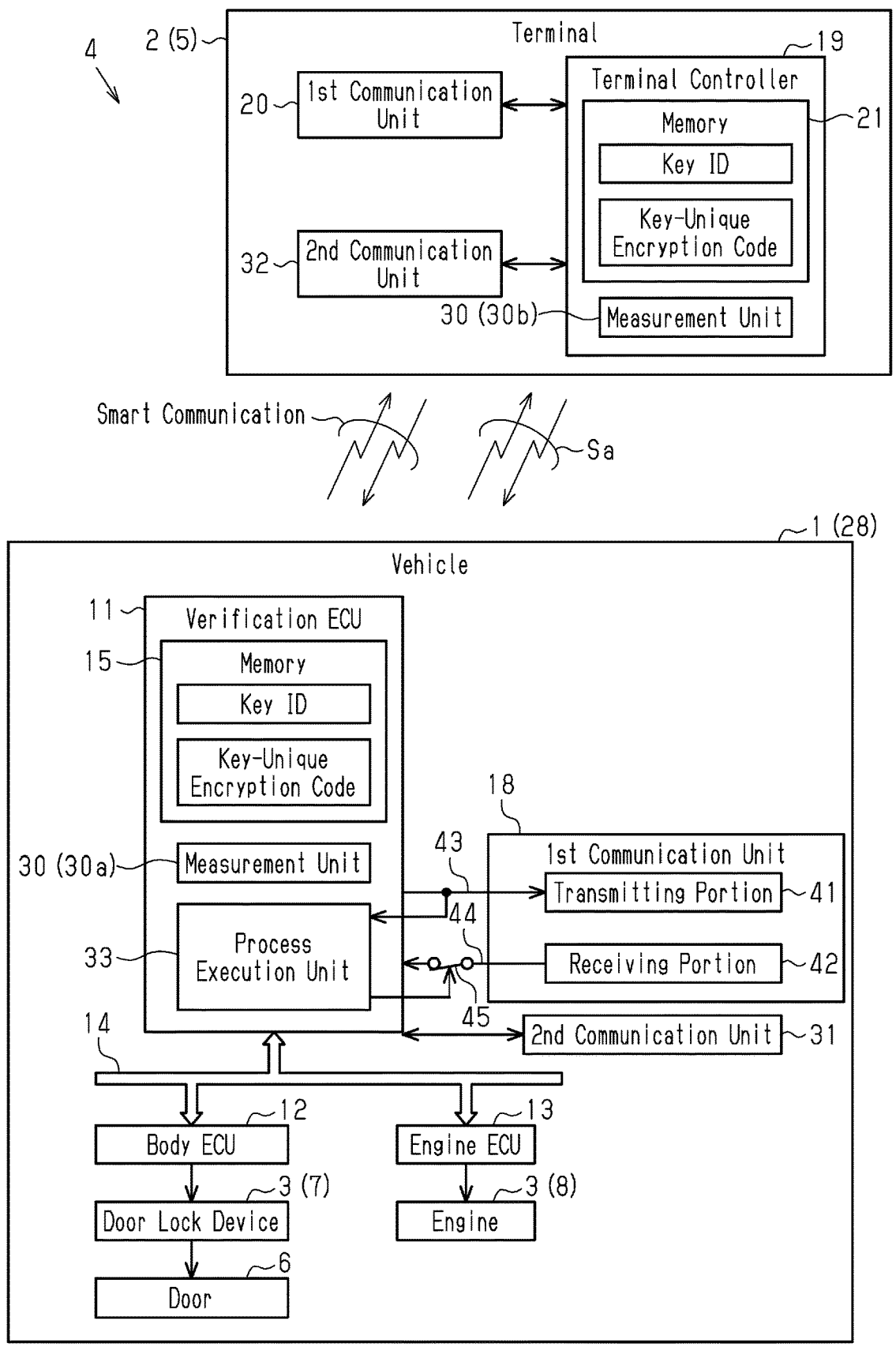
FIG. 5 is a schematic configuration diagram illustrating a second embodiment of an unauthorized communication accomplishment prevention system.

As illustrated in FIG. 5, in a second embodiment of an unauthorized communication accomplishment prevention system 29, the vehicle 1 (verification ECU 11) includes a process execution unit 33 that disconnects communication (in the present example, smart communication). The first communication unit 18 includes a transmitting portion 41 that transmits a radio wave (LF radio wave) toward the terminal 2 and a receiving portion 42 that receives a radio wave (UHF radio wave) from the terminal 2. The process execution unit 33 is configured to receive a signal that is sent through a signal line 43 connecting the verification ECU 11 and the transmitting portion 41. The process execution unit 33 is also configured to control a switch 45 arranged on a signal line 44 connecting the verification ECU 11 and the receiving portion 42 so that the communication for the authentication (in the present example, smart verification) is switched between being maintained and being disconnected.

When it is determined that the measured value Dx is greater than or equal to the specified value Dk (unauthorized smart communication is performed), the process execution unit 33 prohibits the vehicle 1 from receiving a radio wave (in the present example, UHF radio wave) to disconnect the communication for the smart verification. The process execution unit 33 prohibits the vehicle 1 from receiving radio waves, for example, by interrupting signals flowing through the signal line 44, deactivating the power supply of the receiving portion 42, or signal jamming caused by application of an interference radio wave to the signal line 44. In the example illustrated in FIG. 5, the process execution unit 33 switches off the switch 45 arranged on the signal line 44 to interrupt signals flowing through the signal line 44.

Figure 6:
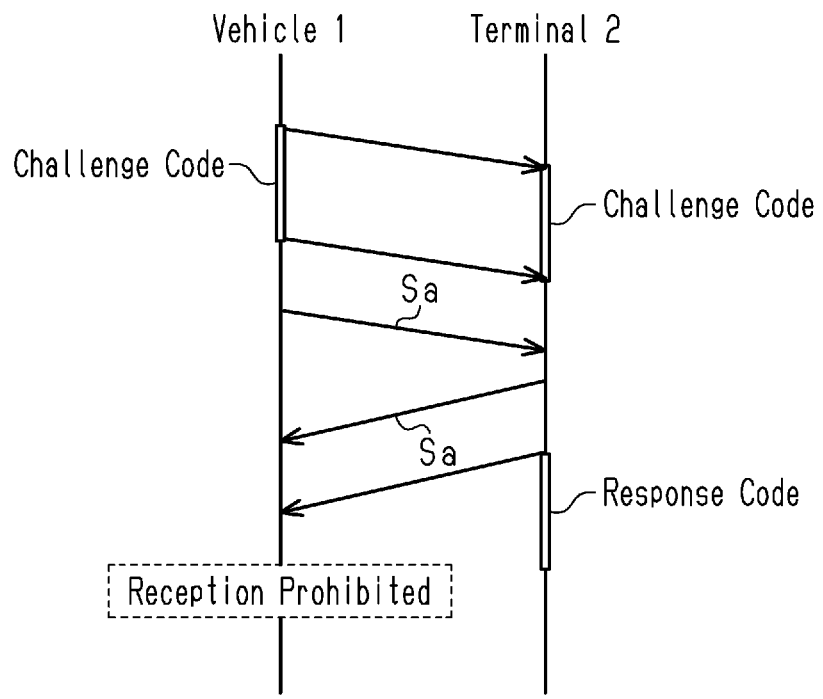
FIG. 6 is a communication sequence chart illustrating a case in which unauthorized communication is detected.

As illustrated in FIG. 6, in the unauthorized communication accomplishment prevention system 29 of the second embodiment, the vehicle 1 obtains the measured value Dx by transmitting a UWB radio wave Sa to the terminal 2 and receiving the UWB radio wave Sa sent back from the terminal 2. In the present example, after transmitting a challenge code, the controller-side measurement unit 30a of the vehicle 1 transmits the UWB radio wave Sa from the second communication unit 31. When receiving the UWB radio wave Sa from the vehicle 1, the terminal-side measurement unit 30b of the terminal 2 transmits the UWB radio wave Sa from the second communication unit 32. When receiving the UWB radio wave Sa from the terminal 2, the controller-side measurement unit 30a of the vehicle 1 calculates the measured value Dx from the propagation time of the UWB radio wave Sa.

When the measured value Dx is greater than or equal to the specified value Dk, the process execution unit 33 prohibits the vehicle 1 from receiving radio waves to disconnect the communication. For example, as described above, the process execution unit 33 switches off the switch 45 on the signal line 44 to interrupt signals flowing through the signal line 44. Alternatively, the process execution unit 33 may deactivate the power supply of the receiving portion 42 or may produce signal jamming by applying an interference radio wave to the signal line 44. With this configuration, even when the terminal 2 transmits a response code, the vehicle 1 cannot receive the response code with the receiving portion 42. Hence, in a situation in which unauthorized communication is highly likely to be performed, the smart verification will not be accomplished.

When the measured value Dx is less than the specified value Dk, the process execution unit 33 does not disconnect the communication for smart verification. In this case, for example, the process execution unit 33 keeps the switch 45 switched on. Also, the process execution unit 33 keeps the power supply of the receiving portion 42 activated and does not produce signal jamming. Thus, the vehicle 1 receives the response code from the terminal 2 and performs the smart verification as normal.

In addition to the advantages of the first embodiment, the second embodiment has the following advantage.

(6) When it is determined that unauthorized communication (in the present example, smart communication) for the authentication is performed based on the measured value Dx, the process execution unit 33 prohibits reception of a radio wave (in the present example, response code) that is needed for performing the authentication, thereby disconnecting the communication for the authentication. Thus, addition of a simple process that prohibits reception of a radio wave prevents accomplishment of smart communication when unauthorized communication is performed without a large change in a conventional electronic key system.

Third Embodiment

A third embodiment will now be described with reference to FIG. 7. The third embodiment differs from the first and second embodiments in that the timing of measuring a distance is changed. Like or the same reference numerals are given to those components that are like or the same as the corresponding components of the first and second embodiments. Mainly, the differences from the first and second embodiments will be discussed below.

Figure 7:
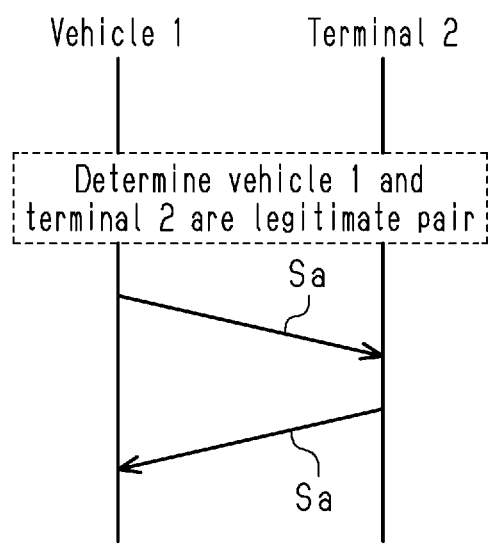
FIG. 7 is a communication sequence chart illustrating a third embodiment of a distance measurement process.

As illustrated in FIG. 7, a third embodiment of an unauthorized communication accomplishment prevention system 29 is realized by the configurations illustrated in FIGS. 1 and 2. In the third embodiment, when the verification ECU 11 determines that the vehicle 1 and the terminal 2 are a legitimate pair, the measurement unit 30 measures the distance by transmitting and receiving the UWB radio wave Sa. The determination that the vehicle 1 and the terminal 2 are a legitimate pair is not limited to accomplishment of authentication (in the present example, smart verification).

For example, when the vehicle 1 receives an ack signal from the terminal 2 in response to a wake signal, the verification ECU 11 may determine that the vehicle 1 and the terminal 2 are a legitimate pair.

In addition to the advantages of the first and second embodiments, the third embodiment has the following advantage.

(7) When the vehicle 1 and the terminal 2 are a legitimate pair, the measurement unit 30 executes the process for obtaining the measured value Dx. With this configuration, after it is determined that the pair is legitimate, calculation of the measured value Dx and determination of appropriateness of the measured value Dx are performed. For example, if authentication (in the present example, smart verification) is not accomplished after distance measurement (calculation of the measured value Dx), the distance measurement is a waste. In the third embodiment, such wasteful distance measurement is avoided to reduce consumption of power in the power supply of the vehicle 1 and the power supply of the terminal 2. In particular, UWB communication consumes a great amount of power. Thus, the efficient distance measurement greatly saves the power supply.

The above-described embodiments may be modified as follows.

The embodiments and the modified examples can be combined as long as the combined modifications remain technically consistent with each other.

Figure 8:
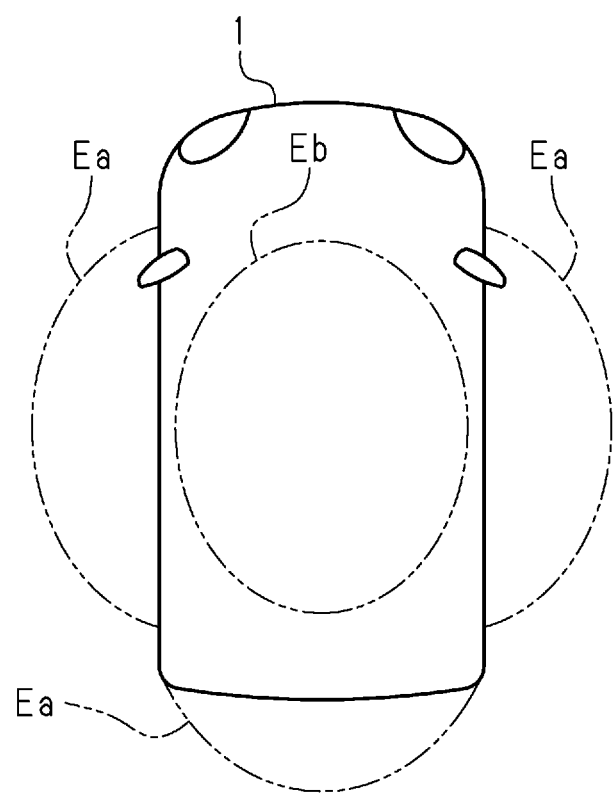
FIG. 8 is a diagram illustrating various areas of smart communication used in distance measurement in a further example.

In the embodiments, without performing UWB communication for distance measurement in the outdoor smart verification, UWB communication for distance measurement may be performed in only the indoor smart verification. For example, as illustrated in FIG. 8, outdoor areas Ea are formed around the vehicle 1, and an indoor area Eb is formed in the vehicle compartment of the vehicle 1 based on the communication range of an LF radio wave (wake signal). In this case, distance measurement (UWB communication) is not performed in the outdoor areas Ea and is performed in only the indoor area Eb. With this configuration, while preventing unauthorized communication that is performed using a relay unit, execution of distance measurement is limited. This reduces power consumption.

In the embodiments, the process for obtaining the measured value Dx through distance measurement (UWB communication) is not limited to the time period Ts (refer to FIG. 2) between reception of a challenge code and transmission of a response code. As described in the first embodiment, the process for obtaining the measured value Dx may be executed in another non-communication period. The process for obtaining the measured value Dx may be executed, for example, in a time period from reception of a wake signal to transmission of an ack signal or a time period from reception of an ack signal to transmission of a challenge code.

The process for disconnecting communication is not limited to those described in the embodiments. The process execution unit 33 may prevent accomplishment of authentication (smart verification) through any other process.

In the embodiments, when the measured value Dx is greater than or equal to the specified value Dk, smart communication is disconnected (forcibly terminated). Instead, when the measured value Dx is greater than or equal to the specified value Dk, the process execution unit 33 may treat the authentication as unaccomplished without disconnecting the smart communication (even when matching is verified in challenge-response authentication and ID verification).

In the embodiments, the unauthorized communication detection function is not limited to a distance measurement function that detects unauthorized communication from a measured distance value. For example, the received signal strength indicator (RSSI) of a radio wave may be obtained so that unauthorized communication is detected from the RSSI value. Alternatively, unauthorized communication may be detected through any other process.

In the embodiments, for example, antennas may be arranged on the vehicle 1 and the terminal 2, and the measurement unit 30 may be arranged on only one of the vehicle 1 and the terminal 2. This modified example may be applied to, for example, a configuration that measures a distance using RSSI.

In the embodiments, the measurement unit 30 and an antenna may be provided on only one of the vehicle 1 and the terminal 2. This modified example is applied to a configuration that obtains the measured value Dx by receiving a reflected wave of a radio wave transmitted from the antenna with the measurement unit 30.

In the embodiments, the distance measurement (calculation of measured value Dx) may be performed, for example, by transmitting radio waves through multiple channels and calculating a radio wave of each channel.

In the embodiments, a response code is transmitted in response to reception of a challenge code. Instead, for example, an ack signal may be transmitted to report that the challenge code is received.

In the second embodiment, the process for prohibiting reception of a radio wave needed for the process for performing authentication is not limited to interruption of signals flowing through a signal line, deactivation of the power supply of the receiving portion, and signal jamming. Any other process may be used. In an example, a process may be configured not to receive a signal based on a radio wave received by the verification ECU 11 (microcomputer).

In the embodiments, the distance measurement is not limited to a process that uses the UWB radio wave Sa. A radio wave having another frequency may be used:

In the embodiments, the frequency of radio waves used in communication between the vehicle 1 and the terminal 2 and the communication method may be changed to various modes.

In the embodiments, the smart verification system may be changed so that a wake signal is transmitted from the terminal 2 to the vehicle 1. Also, a challenge code may be transmitted from the terminal 2 to the vehicle 1.

In the embodiments, the position of an LF antenna used in the smart verification system is not particularly limited. For example, LF antennas may be arranged at the left and right sides of the vehicle body, and whether the electronic key 5 is located inside or outside the vehicle may be determined based on a combination of response signals from the electronic key 5 receiving LF signals from the left and right LF antennas.

In the embodiments, the authentication of the terminal 2 is not limited to challenge-response authentication. Another authentication that authenticates that the terminal 2 and the vehicle 1 (the communication peer 28) are a legitimate pair through bidirectional communication that is performed between the terminal 2 and the vehicle 1 (the communication peer 28) may be used.

In the embodiments, the electronic key system 4 is not limited to being used as the smart verification system and may be any other system that authenticates the terminal 2.

In the embodiments, the terminal 2 is not limited to the electronic key 5 and may be, for example, a mobile electronic terminal such as a smartphone.

In the embodiments, the communication peer 28 is not limited to the vehicle 1 and may be changed to any apparatus or device configured to communicate with the terminal 2.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A system that prevents accomplishment of unauthorized communication between a terminal and a communication peer, the system comprising:
    a terminal controller arranged in the terminal;
    a verification electronic control unit (ECU) arranged in the communication peer, wherein the verification ECU exchanges a plurality of signals with the terminal controller through wireless communication to authenticate the terminal in accordance with an authentication communication sequence;
    a measurement unit implemented in at least one of the terminal controller or the verification ECU to obtain a measured value corresponding to a distance between the terminal and the communication peer based on a distance measuring radio wave propagated between the terminal and the communication peer; and
    a process execution unit implemented in at least one of the terminal controller or the verification ECU to determine whether the measured value is appropriate and to determine based on the determination result whether or not to continue the authentication communication sequence,
    wherein the distance measuring radio wave is propagated between the terminal and the communication peer in a non-communication period during which none of the plurality of signals is communicated in the authentication communication sequence, and
    the measurement unit executes a process for obtaining the measured value in the non-communication period of the authentication communication sequence.

2. The system according to claim 1,
    wherein the authentication according to the authentication communication sequence includes challenge-response authentication that calculates a response code in each of the terminal controller and the verification ECU from a challenge code, which is a random number, and determines whether the response code calculated in the terminal controller matches the response code calculated in the verification ECU, and
    the process for obtaining the measured value is executed in a time period from when one of the terminal controller and the verification ECU receives the challenge code from the other of the terminal controller and the verification ECU to when the one of the terminal controller and the verification ECU transmits the response code to the other of the terminal controller and the verification ECU.

3. The system according to claim 2,
    wherein when the process execution unit detects unauthorized communication based on the measured value, the process execution unit controls the authentication communication sequence so that the one of the terminal controller and the verification ECU that received the challenge code is prohibited from transmitting the response code, thereby terminating the authentication communication sequence.

4. The system according to claim 1,
    wherein when the process execution unit detects unauthorized communication based on the measured value, the process execution unit controls the authentication communication sequence so that reception of a radio wave needed for performing the authentication is prohibited, thereby terminating the authentication communication sequence.

5. The system according to claim 1,
    wherein when the terminal controller and the verification ECU are a legitimate pair, the measurement unit executes the process for obtaining the measured value.

6. A method for preventing accomplishment of unauthorized communication between a terminal and a communication peer, the method comprising:
    obtaining, by a measurement unit implemented in at least one of a terminal controller arranged in the terminal or a verification electronic control unit (ECU) arranged in the communication peer, a measured value corresponding to a distance between the terminal and the communication peer based on a distance measuring radio wave propagated between the terminal and the communication peer;
    determining, by a process execution unit implemented in at least one of the terminal controller or the verification ECU, whether the measured value is appropriate to produce a determination result; and
    determining, by the process execution unit, based on the determination result whether or not to continue an authentication communication sequence,
    wherein the verification ECU exchanges a plurality of signals with the terminal controller through wireless communication to authenticate the terminal in accordance with the authentication communication sequence,
    wherein the distance measuring radio wave is propagated between the terminal and the communication peer in a non-communication period during which none of the plurality of signals is communicated in the authentication communication sequence, and
    wherein the measurement unit executes a process for obtaining the measured value in the non-communication period of the authentication communication sequence.

* * * * *